3,639,404
ALKYLTHIOCARBONYLDECAHYDRO-QUINOLINES

Sidney B. Richter, Chicago, and Alfred A. Levin, Skokie, Ill., assignors to Velsicol Chemical Corporation, Chicago, Ill.
No Drawing. Filed Dec. 13, 1968, Ser. No. 783,713
Int. Cl. C07d 33/62
U.S. Cl. 260—283 S                             3 Claims

ABSTRACT OF THE DISCLOSURE

This invention discloses new chemical compounds of the formula

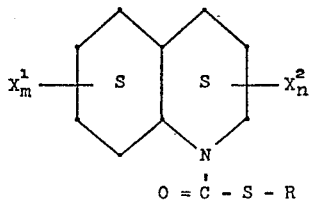

wherein $X^1$ and $X^2$ are alkyl; $m$ and $n$ are integers from 0 to 3, provided that $m+n$ is from 0 to 3; and R is alkyl. The compounds of the above description are useful as herbicides.

---

This invention relates to new chemical compositions of matter and more particularly to compounds of the formula

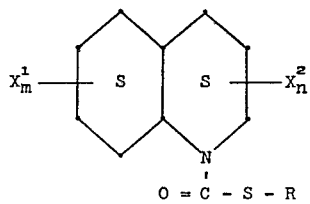

wherein $X^1$ and $X^2$ are alkyl; $m$ and $n$ are integers from 0 to 3, provided that $m+n$ is from 0 to 3; and R is alkyl.

In a preferred embodiment of this invention $X^1$, $X^2$ and R are each lower alkyl having a maximum of ten carbon atoms.

The compounds of the present invention are unexpectedly useful as herbicides.

The compounds of this invention can be readily prepared by reacting decahydroquinoline or an alkyl substituted decahydroquinoline with an alkyl halothioloformate. This reaction can be readily effected by adding the chlorothioloformate dissolved in an inert organic solvent such as benzene, toluene or xylene to an equimolar amount of decahydroquinoline dissolved in a similar solvent in the presence of an acid scavenger such as a tertiary amine or an alkali metal hydroxide or carbonate. This addition can normally be performed at room temperature with stirring of the reaction mixture. After the addition is completed the mixture can be heated at reflux for a period of from about ½ to about 8 hours to ensure the completion of the reaction. After this time the desired product can be recovered after first filtering the reaction mixture to remove the acid scavenger salt which has formed and thereafter stripping the mixture of any solvents used to yield the desired product as a residue. This product can then be used as such or can be further purified by recrystallization, distillation or other common techniques well known in the art.

Exemplary suitable decahydroquinolines for preparing the compounds of this invention are decahydroquinoline, 3-methyldecahydroquinoline, 4a - methyldecahydroquinoline, 8a-methyldecahydroquinoline, 6 - methyldecahydroquinoline, 2-propyldecahydroquinoline, 7-methyldecahydroquinoline, 8-methyldecahydroquinoline, 2,4-dimethyldecahydroquinoline, 2,2,4 - trimethyldecahydroquinoline, 2,3,4 - trimethyldecahydroquinoline, 2,3,8 - trimethyldecahydroquinoline, 2,4,6-trimethyldecahydroquinoline, 2,4,7-trimethyldecahydroquinoline, 2,4,8 - trimethyldecahydroquinoline, and the like.

Suitable chlorothioloformates for preparing the compounds of the present invention are methyl chlorothioloformate, ethyl chlorothioloformate, n-propyl chlorothioloformate, isopropyl chlorothioloformate, n-butyl chlorothioloformate, sec.-butyl chlorothioloformate, t-butyl chlorothioloformate, n-pentyl chlorothioloformate, n-octyl chlorothioloformate, and the like.

The manner in which the compounds of this invention can be prepared readily is more specifically illustrated in the following examples.

EXAMPLE 1

Preparation of 1-ethylthiocarbonyldecahydroquinoline

A solution of decahydroquinoline (13.9 grams; 0.1 mol) and triethylamine (10 grams) in benzene (150 ml.) was charged into a 250 ml. glass reaction flask equipped with mechanical stirrer, reflux condenser and addition funnel. The solution was stirred and ethyl chlorothioloformate (12.4 grams; 0.1 mol) dissolved in benzene (50 ml.) was added dropwise over a period of 15 minutes to the reaction flask. An exotherm was observed. The mixture was then heated at reflux for an additional period of about 2 hours. After this time the mixture was cooled and filtered to remove the triethylamine hydrochloride which had formed. The filtrate was washed with dilute hydrochloric acid and with water, dried over anhydrous magnesium sulfate and filtered. The dried filtrate was stripped of benzene under reduced pressure to yield an oil. The oil was distilled under reduced pressure to yield the desired product 1-ethylthiocarbonyldecahydroquinoline as a colorless oil having a boiling point of 105 to 106° C. at 0.1 mm. of Hg pressure, an index of refraction at 24° C. of 1.5293 and having the following elemental analysis as calculated for $C_{12}H_{21}NOS$:

Theoretical (percent): C, 63.39; H, 9.31; N, 6.16; S, 14.10. Found (percent): C, 63.35; H, 9.56; N, 6.17; S, 14.10.

EXAMPLE 2

Preparation of 1-methylthiocarbonyl-decahydroquinoline

A solution of decahydroquinoline (13.9 grams; 0.1 mol) in benzene (150 ml.) and triethylamine (10 grams) are charged into a glass reaction flask equipped with a mechanical stirrer, reflux condenser and addition funnel. The solution is stirred and methyl chlorothioloformate (11 grams; 0.1 mol) dissolved in benzene (50 ml.) is slowly added over a period of about 20 minutes. After the addition is completed the mixture is heated at reflux for a period of about 2 hours. After this time the mixture is cooled and filtered to remove the triethylamine hydrochloride. The filtrate is washed with dilute aqueous hydrochloric acid and with water, dried over anhydrous magnesium sulfate and filtered. The dried filtrate is stripped of benzene under reduced pressure to yield the desired product 1-methylthiocarbonyldecahydroquinoline.

EXAMPLE 3

Preparation of 1-isopropylthiocarbonyl-decahydroquinoline

A solution of decahydroquinoline (13.9 grams; 0.1 mol) in benzene (200 ml.) and triethylamine (10 grams) are charged into a glass reaction vessel equipped with a mechanical stirrer, reflux condenser and addition funnel. The solution is stirred and isopropyl chlorothioloformate (14 grams; 0.1 mol) dissolved in benzene (50 ml.) is slowly added over a period of about 20 minutes. After the addition is completed the reaction mixture is heated at reflux for a period of about 2 hours. After this time the mixture is cooled and filtered. The filtrate is then washed with water, is dried over anhydrous magnesium sulfate, filtered free of drying agent, and is stripped of solvent to yield the desired product 1-isopropylthiocarbonyldecahydroquinoline.

EXAMPLE 4

Preparation of 1-methylthiocarbonyl-3-methyldecahydroquinoline

A solution of 3-methyldecahydroquinoline (15 grams; 0.1 mol) in benzene (200 ml.) and triethylamine (10 grams) are charged into a glass reaction vessel equipped with a mechanical stirrer, reflux condenser and addition funnel. The solution is stirred at room temperature and methyl chlorothioloformate (11 grams; 0.1 mol dissolved) in benzene (50 ml.) is slowly added over a period of about 20 minutes. After the addition is completed the mixture is heated at reflux for a period of about 2 hours. After this time the mixture is cooled and filtered to remove the triethylamine hydrochloride. The filtrate is washed with dilute aqueous hydrochloric acid and with water, dried over anhydrous magnesium sulfate and filtered. The dried filtrate is stripped of benzene under reduced pressure to yield the desired product 1-methylthiocarbonyl-3-methyldecahydroquinoline.

Other compounds within the scope of this invention can be prepared by the procedures described in the foregoing examples. Presented in the following examples are the essential ingredients required to prepare the indicated named compounds according to the procedures heretofore described.

EXAMPLE 5

Decahydroquinoline+n-propyl chlorothioloformate+triethylamine=1 - n-propylthiocarbonyldecahydroquinoline.

EXAMPLE 6

Decahydroquinoline+n - butyl chlorothioloformate+triethylamine=1-n-butylthiocarbonyldecahydroquinoline.

EXAMPLE 7

Decahydroquinoline+sec-butyl chlorothioloformate+triethylamine=1 - sec - butylthiocarbonyldecahydroquinoline.

EXAMPLE 8

Decahydroquinoline+t - butyl chlorothioloformate+triethylamine=1-t-butylthiocarbonyldecahydroquinoline.

EXAMPLE 9

Decahydroquinoline+n - pentyl chlorothioloformate+triethylamine=1 - n - pentylthiocarbonyldecahydroquinoline.

EXAMPLE 10

Decahydroquinoline+n-heptyl chlorothioloformate+triethylamine=1-n-heptylthiocarbonyldecahydroquinoline.

EXAMPLE 11

Decahydroquinoline+n - decyl chlorothioloformate+triethylamine=1-n-decylthiocarbonyldecahydroquinoline.

EXAMPLE 12

3 - propyldecahydroquinoline+ethyl chlorothioloformate+triethylamine=1-ethylthiocarbonyl-3 - propyldecahydroquinoline.

EXAMPLE 13

2,3-dimethyldecahydroquinoline+isopropyl chlorothioloformate+triethylamine=1-isopropylthiocarbonyl - 2,3-dimethyldecahydroquinoline.

EXAMPLE 14

2,4,8-trimethyldecahydroquinoline+methyl chlorothioloformate+triethylamine=1-methylthiocarbonyl - 2,4,8-trimethyldecahydroquinoline.

For practical use as herbicides, the compounds of this invention are generally incorporated into herbicidal compositions which comprise an inert carrier and a herbicidally toxic amount of such a compound. Such herbicidal compositions, which can also be called formulations, enable the active compound to be applied conveniently to the site of the weed infestation in any desired quantity. These compositions can be solids such as dusts, granules or wettable powders; or they can be liquids such as solutions, aerosols or emulsifiable concentrates.

For example, dusts can be prepared by grinding and blending the active compound with a solid inert carrier such as the talcs, clays, silicas, pyrophyllite, and the like. Granular formulations can be prepared by impregnating the compound, usually dissolved in a suitable solvent, onto and into granulated carriers such as the attapulgites or the vermiculites, usually of a particle size range of from about 0.3 to 1.5 mm. Wettable powders, which can be dispersed in water or oil to any desired concentration of the active compound, can be prepared by incorporating wetting agents into concentrated dust compositions.

In some cases the active compounds are sufficiently soluble in common organic solvents such as kerosene or xylene so that they can be used directly as solutions in these solvents. Frequently, solutions of herbicides can be dispersed under superatmospheric pressure as aerosols. However, preferred liquid herbicidal compositions are emulsifiable concentrates, which comprise an active compound according to this invention and as the inert carrier, a solvent and an emulsifier. Such emulsifiable concentrates can be extended with water and/or oil to any desired concentration of active compound for application as sprays to the site of the weed infestation. The emulsifiers most commonly used in these concentrates are nonionic or mixtures of nonionic with anionic surface-active agents. With the use of some emulsifier systems an inverted emulsion (water in oil) can be prepared for direct application to weed infestations.

A typical herbicidal composition according to this invention is illustrated by the following example, in which the quantities are in parts by weight.

EXAMPLE 15

Preparation of a dust

Product of Example 1 _____ 10
Powdered talc _____ 90

The above ingredients are mixed in a mechanical grinder-blender and are ground until a homogeneous, free-flowing dust of the desired particle size is obtained. This dust is suitable for direct application to the site of the weed infestation.

The compounds of this invention can be applied as herbicides in any manner recognized by the art. One method for the control of weeds comprises contacting the locus of said weeds with a herbicidal composition comprising an inert carrier and, as an essential active ingredient, in a quantity which is herbicidally toxic to said weeds, a compound of the present invention. The concentration of the new compounds of this invention in the herbicidal compositions will vary greatly with the type of formulation and the purpose for which it is designed, but generally the herbicidal compositions will comprise from about 0.05 to about 95 percent by weight of the active compounds of this invention. In a preferred embodiment of this invention, the herbicidal compositions will comprise from about 5 to about 75 percent by weight of the active compound. The compositions can also comprise such additional substances as other pesticides, such as insecticides, nematocides, fungicides, and the like; stabilizers, spreaders, deactivators, adhesives, stickers, fertilizers, activators, synergists, and the like.

The compounds of the present invention are also useful when combined with other herbicides and/or defoliants, desiccants, growth inhibitors, and the like in the herbicidal compositions heretofore described. These other materials can comprise from about 5% to about 95% of the active ingredients in the herbicidal compositions. Use of combinations of these other herbicides and/or defoliants, desiccants, etc. with the compounds of the present invention provide herbicidal compositions which are more effective in controlling weeds and often provide results unattainable with separate compositions of the individual herbicides. The other herbicides, defoliants, desiccants and plant growth inhibitors, with which the compounds of this invention can be used in the herbicidal compositions to control weeds, can include chlorophenoxy herbicides such as 2,4-D, 2,4,5-T, MPCA, MCPB, 4(2,4-DB), 2,4-DEB, 4-CPB, 4-CPA, 4-CPP, 2,4,5-TB, 2,4,5-TES, 3,4-DA, silvex, and the like; carbamate herbicides such as IPC, CIPC, swep, barban, BCPC, CEPC, CPPC, and the like; thiocarbamate and dithiocarbamate herbicides such as CDEC, metham sodium, EPTC, diallate, PEBC, perbulate, vernolate, and the like; substituted urea herbicides such as norea, siduron, dichloral urea, chloroxuron, cycluron, fenuron, monuron, monuron TCA, diuron, linuron, monolinuron, neburon, buturon, trimeturon, and the like; symmetrical triazine herbicides such as simazine, chlorazine, atratone, desmetryne, norazine, ipazine, prometryn, atrazine, trietazine, simetone, prometone, propazine, ametryne, and the like; chloroacetamide herbicides such as alpha-chloro-N,N-dimethylacetamide, CDEA, CDAA, alpha-chloro-N-isopropylacetamide, 2-chloro-N-isopropylacetanilide, 4 - (chloroacetyl)morpholine, 1-(chloroacetyl)piperidine, and the like; chlorinated aliphatic acid herbicides such as TCA, dalapon, 2,3-dichloropropionic acid, 2,2,3-TPA, and the like; chlorinated benzoic acid and phenylacetic acid herbicides such as 2,3,6-TBA, 2,3,5,6-TBA, dicamba, tricamba, amiben, fenac, PBA, 2-methoxy-3,6-dichlorophenylacetic acid, 3-methoxy-2,6-dichlorophenylacetic acid, 2-methoxy-3,5,6-trichlorophenylacetic acid, 2,4 - dichloro - 3-nitrobenzoic acid, and the like; and such compounds as aminotriazole, maleic hydrazide, phenyl mercuric acetate, endothal, biuret, technical chlordane, dimethyl 2,3,5,6-tetrachloroterephthalate, diquat, erbon, DNC, DNBP, dichlobenil, DPA, diphenamid, dipropalin, trifluralin, solan, dicryl, merphos, DMPA, O-S-dimethyl tetrachlorothioterephthalate, methyl 2,3,5,6 - tetrachloro - N - methoxy-N-methylterephthalamate, 2 - [(4 - chloro-o-tolyl)-oxy]-N-methoxyacetamide, DSMA, MSMA, potassium azide, acrolein, benefin, bensulide, AMS, bromacil, bromoxynil, cacodylic acid, CMA, CPMF, cypromid, DCB, DCPA, dichlone, diphenatril, DMTT, DNAP, EBEP, EXD, HCA, ioxynil, IPX, isocil, potassium cyanate, MAA, MAMA, MCPES, MCPP, MH, molinate, NPA, OCH, paraquat, PCP, picloram, DPA, PCA, pyrichlor, sesone, terbacil, terbutol, TCBA, brominil, CP–50144, H–176–1, H–732, M–2901, planavin, sodium tetraborate, calcium cyanamid, DEF, ethyl xanthogen disulfide, sindone, sindone B, propanil, and the like.

Such herbicides can also be used in the methods and compositions of this invention in the form of their salts, esters, amides and other derivatives whenever applicable to the particular parent compounds.

Weeds are undesirable plants growing where they are not wanted, having no economic value, and interfering with the production of cultivated crops, with the growing of ornamental plants, or with the welfare of livestock. Many types of weeds are known, including annuals such as pigweed, lambsquarters, foxtail, crabgrass, wild mustard, field pennycress, ryegrass, goose-grass, chickweed, wild oats, velvet leaf, purselane, barnyard grass, smartweed, knotweed, cocklebur, wild buckwheat, kochia, medic, corn cockle, ragweed, sowthistle, coffee-weed, croton, cuphea, dodder, fumitory, groundsel, hemp nettle, knowel, spurge, spurry, emex, jungle rice, pondweed, dog fennel, carpetweed, morning glory, bedstraw, ducksalad and naiad; biennials such as wild carrot, matricaria, wild barley, campion, chamomile, burdock, mullein, round-leaved mallow, bull thistle, hounds-tongue, moth mullein and purple star thistle; or perennials such as white cockle, perennial rye-grass, quackgrass, Johnson grass, Canada thistle, hedge bindweed, Bermuda grass, sheep sorrel, curly dock, nutgrass, field chickweed, dandelion, campanula, field bindweed, Russian knapweed, mesquite, toadflax, yarrow, aster, gromwell, horsetail, ironweed, sesbania, bulrush, cattail and winter-cress.

Similarly, such weeds can be classified as broadleaf or grassy weeds. It is economically desirable to control the growth of such weeds without damaging beneficial plants or livestock.

The new compounds of this invention are particularly valuable for weed control because they are toxic to many species and groups of weeds while they are relatively non-toxic to many beneficial plants. The exact amount of compound required will depend on a variety of factors, including the hardiness of the particular weed species, weather, type of soil, method of application, the kind of beneficial plants in the same area, and the like. Thus, while the application of up to only about one or two ounces of active compound per acre may be sufficient for good control of a light infestation of weeds growing under adverse conditions, the application of ten pounds or more of active compound per acre may be required for good control of a dense infestation of hardy perennial weeds growing under favorable conditions.

The herbicidal toxicity of the new compounds of this invention can be illustrated by many of the established testing techniques known to the art, such as pre- and post-emergence testing.

The herbicidal activity of the compounds of this invention was demonstrated by experiments carried out for the pre-emergence control of a variety of weeds. In these experiments small plastic greenhouse pots filled with dry soil were seeded with the various weed seeds. Twenty-four hours or less after seeding the pots were sprayed with water until the soil was wet and 1-ethylthiocarbonyldecahydroquinoline formulated as an aqueous emulsion of an acetone solution containing emulsifiers was sprayed at the indicated concentrations on the surface of the soil.

After spraying, the soil containers were placed in the greenhouse and provided with supplementary heat as required and daily or more frequent watering. The plants were maintained under these conditions for a period of from 15 to 21 days, at which time the condition of the plants and the degree of injury to the plants was rated on a scale of from 0 to 10, as follows: 0=no injury, 1, 2=slight injury, 3, 4=moderate injury, 5, 6=moderately severe injury, 7, 8, 9=severe injury and 10=death. The effectiveness of these compounds is demonstrated by the following data:

TABLE I

| Weed species | Concentration of test compound in lbs./acre | Injury rating |
| --- | --- | --- |
| Barnyard grass | 8 | 9 |
| Do | 4 | 8.5 |
| Crabgrass | 8 | 9 |
| Do | 4 | 9 |
| Downy brome | 8 | 10 |
| Do | 4 | 9.2 |
| Johnson grass | 8 | 10 |
| Do | 4 | 8.2 |

We claim:
1. A compound of the formula

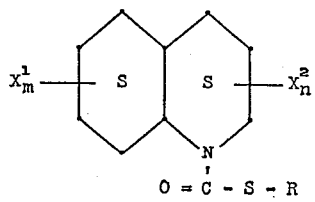

wherein $X^1$ and $X^2$ are methyl, ethyl or propyl; $m$ and $n$ are integers from 0 to 3, provided that $m+n$ is from 0 to 3; and R is alkyl of 1 to 10 carbons.

2. The compound of claim 1, 1-methylthiocarbonyldecahydroquinoline.

3. The compound of claim 1, 1-ethylthiocarbonyldecahydroquinoline.

References Cited

UNITED STATES PATENTS

| | | | |
|---|---|---|---|
| 1,873,934 | 8/1932 | Lommel | 260—283 |
| 3,066,020 | 11/1962 | Tilles | 71—94 |
| 3,275,628 | 9/1966 | Brown | 260—287 X |
| 3,318,676 | 5/1967 | Harman | 71—94 |

DONALD G. DAUS, Primary Examiner

U.S. Cl. X.R.

71—94; 260—283 R, 455 R